United States Patent
Sudhakar

(10) Patent No.: US 8,346,719 B2
(45) Date of Patent: Jan. 1, 2013

(54) MULTI-NODE REPLICATION SYSTEMS, DEVICES AND METHODS

(75) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 1034 days.

(21) Appl. No.: 11/973,198

(22) Filed: Oct. 5, 2007

(65) Prior Publication Data
US 2008/0288811 A1    Nov. 20, 2008

(30) Foreign Application Priority Data
May 17, 2007 (IN) .......................... 1072/DEL/2007

(51) Int. Cl.
*G06F 7/00* (2006.01)
*G06F 17/00* (2006.01)

(52) U.S. Cl. ......... 707/610; 707/624; 707/638; 707/704
(58) Field of Classification Search ........................ None
See application file for complete search history.

(56) References Cited

U.S. PATENT DOCUMENTS

| | | | |
|---|---|---|---|
| 5,157,663 A | 10/1992 | Major | |
| 5,778,395 A | 7/1998 | Whiting et al. | |
| 5,991,771 A | 11/1999 | Falls et al. | |
| 6,061,740 A | 5/2000 | Ferguson et al. | |
| 6,353,898 B1 | 3/2002 | Wipfel et al. | |
| 6,477,583 B1 | 11/2002 | Zayas et al. | |
| 6,519,610 B1 | 2/2003 | Ireland et al. | |
| 6,578,035 B1 | 6/2003 | Barker | |
| 6,671,688 B1 | 12/2003 | Nikols et al. | |
| 6,973,464 B1 | 12/2005 | Gao | |
| 7,124,320 B1 | 10/2006 | Wipfel | |
| 7,177,917 B2 * | 2/2007 | Giotta | 709/219 |
| 7,457,796 B2 * | 11/2008 | Lashley et al. | 707/2 |
| 7,512,707 B1 * | 3/2009 | Manapragada et al. | 709/240 |
| 7,627,614 B2 * | 12/2009 | Hu et al. | 707/203 |
| 8,015,211 B2 * | 9/2011 | Marceau et al. | 707/802 |
| 2002/0188655 A1 * | 12/2002 | Brown et al. | 709/201 |
| 2003/0167420 A1 | 9/2003 | Parsons | |
| 2004/0193459 A1 | 9/2004 | Delaney | |
| 2005/0028026 A1 | 2/2005 | Shirley et al. | |
| 2006/0010170 A1 * | 1/2006 | Lashley et al. | 707/200 |
| 2006/0173851 A1 * | 8/2006 | Singh et al. | 707/10 |

(Continued)

OTHER PUBLICATIONS

Ekenstam, T., C. Matheny, P. Reiher, and G. Popek: 2001, 'The Bengal Database Replication System', Distributed and Parallel Databases 9(3).*

(Continued)

*Primary Examiner* — Jay Morrison
(74) *Attorney, Agent, or Firm* — Schwegman, Lundberg & Woessner, P.A.

(57) ABSTRACT

Replication techniques are presented. According to an embodiment of a method, a node of a replicated storage network is assigned to be an owner of a data block to issue write memory block commands. The network includes at least two nodes including the node assigned to be the owner. If a read memory block command is received to read the data block, a read_lock is issued for the data block, the data block is read, and the read_lock for the data block is released. If a write memory block command is received to write new data to the data block, a write_lock is issued for the data block, the data block is written and a version associated with the data block is incremented, and the write_lock for the data block is released.

18 Claims, 5 Drawing Sheets

U.S. PATENT DOCUMENTS

2006/0200497 A1* 9/2006 Hu et al. .................. 707/200

OTHER PUBLICATIONS

L. Hejtmanek, "Distributed Storage Framework with Offline Support,", Jan. 2007, PhD. Thesis, Masaryk University, Brno, Czech Republic.*

Exploiting atomic broadcast in replicated databases (extended abstract), by Agrawal et al., Euro-Par'97 Parallel Processing, Lecture Notes in Computer Science, 1997, vol. 1300/1997, pp. 496-503.*

Modular Synchronization in Multiversion Databases: Version Control and Consurrency Control, Proc. ACM-SIGMOD International Conference of Management of Data, Portland, May 1989.*

Using Broadcast Primitives in Replicated Databases, by Agrawal et al., Proceedings of ICDCS'98, May 1998, Amsterdam, The Netherlands.*

Ranganathan, Shyamsundar, et al., "Techniques for Data Replication with Snapshot Capabilities", U.S. Appl. No. 11/823,426, filed Jun. 27, 2007, 25 pgs.

Reisner, Philipp, "DRBD v8, Replicated Storage with Shared Disk Semantics", *Proceedings of the 12th International Linux System Technology Conference*, (Sep. 18, 2005),11 pgs.

Sudhakar, Gosukonda V., et al., "Techniques for Versioning Files", filed Oct. 5, 2007, 25 pgs.

* cited by examiner

MULTI-NODE REPLICATION SYSTEMS, DEVICES AND METHODS

RELATED APPLICATIONS

The present application claims priority to India Patent Application No. 1072/DEL/2007 filed in the India Patent Office on May 17, 2007 and entitled "MULTI-NODE REPLICATION SYSTEMS, DEVICES AND METHODS;" the disclosure of which is incorporated by reference herein.

FIELD

This application relates generally to data processing and more particularly to data replication.

BACKGROUND

Data is often collected, organized, and indexed for many transactions and communications that occur in today's global economy. This information has become vital to enterprises and individuals. Consequently, a variety of techniques for securing, backing up, and replicating information exists in the industry.

A data replication concern is ensuring that information is available should a central source fail or become unavailable for a variety of other reasons, such as planned power outages, network upgrades, and software upgrades. If data replication is properly done, services and users can still seamlessly access the remote data source with uninterrupted service if a master data source is unavailable. Thus not only is information secured and backed up, information is also intended to be available twenty-four hours a day, seven days a week, and 365 days a year.

Known data replication techniques, such as DRBD (Distributed Replicated Block Device), offer only a two node active-active configuration, and do not provide a solution beyond two nodes.

SUMMARY

Various embodiments provide data replication. According to an embodiment of a method, a node of a replicated storage network is assigned to be an owner of a data block to issue write memory block commands. The network includes at least two nodes including the node assigned to be the owner. If a read memory block command is received to read the data block, a read_lock is issued for the data block, the data block is read, and the read_lock for the data block is released. If a write memory block command is received to write new data to the data block, a write_lock is issued for the data block by the owner of that block, the data block is written and a version associated with the data block is incremented, and the write_lock for the data block is released.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

DETAILED DESCRIPTION

Figure 1:
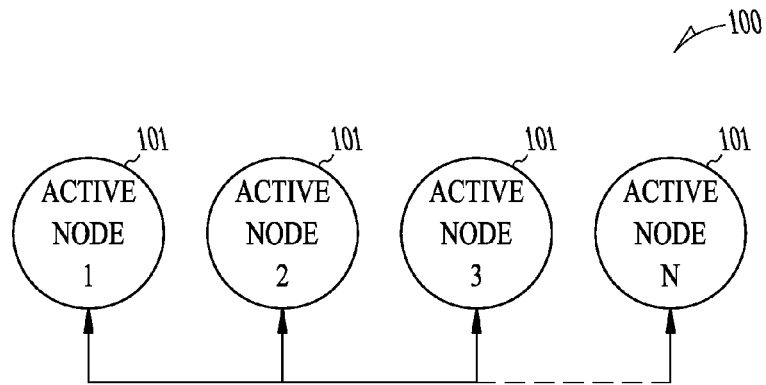
FIG. 1 is an illustration of a multi-node network.

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

As used herein a "data source" refers to a volume or collection of volumes that house the data for applications. An "application" refers to a set of software instructions, a service, or a system that interacts with data housed at the data source. A "replicated volume" or "replicated source" refers to a mirror of a local volume or local data source. That is, the replicated volume is a remote data source that is external to a local volume and that is being kept in synchronization with the local volume via some mechanism, such as synchronous block-based data replication. The terms "local," "remote," "source," and "destination" are relative, which means that when something is designated as being "local" or a "source" than this refers to an entity or resource operating within the environment in which the applications operate against the master data source and volume. Conversely, when something is designated as being "remote" or a "destination" than this refers to an entity or resource operating within an environment where the replicated volume is being maintained. An "owner node" for a block in a replicated storage network is the manager for the block, and other nodes with in the network are referred to as "non-owner nodes".

Various embodiments can be implemented in existing network architectures, directory services, security systems, storage interfaces, operating systems, file systems, backup systems, replication systems, and/or communication devices. For example, in some embodiments, the techniques presented herein are implemented in whole or in part in the Novell® network services, proxy server products, email products, operating system products, and/or directory services products distributed by Novell®, Inc., of Provo, Utah. The replication techniques disclosed herein can be implemented a suite of disaster recovery or high availability solutions both at disk block level and file system level to database level. Various embodiments can be implemented in a variety of architectural platforms, operating and server systems, devices, systems, or applications. Any particular architectural layout or implementation presented herein is provided for purposes of illustration and comprehension only and is not intended to be limiting.

FIG. 1 illustrates a network 100 with n active nodes 101. The present subject matter provides a replication technique between or among any number of active (read-write) nodes. The management of a group of blocks is assigned to participating nodes. The grouping is done by a function that takes block number as input and produces the node number that it belongs to for managing. Locks and version numbers are also used.

The techniques can be applied to disks, or to any resource which has certain characteristics. That is, any resource such as disk blocks, files and database records can be shared using the replication technique. For files, for example, the hash of the file name with full path can serve as the key. A resource to be shared using the replication technique disclosed in this document should have two ways of consumption mappable to read and write or open_for_read and open_for_write; should have all reads/open_for_reads have one single entry point and all writes/open_for_writes have one single entry point so that locks can be applied, and should be able to divide the resource into different sets which can be addressed (like blocks/files/records) for the above operations.

A node of a replicated storage network is assigned to be an owner of a data block. The owner of the data block is able to issue write memory block commands. Each data block can be assigned a unique block number and each node can be identified by a unique node number. The mapping function should be able to distribute the input numbers evenly across all node numbers. An embodiment for assigning the node divides the block number of the data block by the number of nodes in the network, identifies a resulting remainder value, and assigns the node with a node number that corresponds to the remainder value to be the owner of the data block. In a four node replicated storage network, for example, if the block number of the block to be written gives a remainder '0' when divided by 4 then the node_1 will be owner of those blocks. If the reminder is '1' then node_2 will be owner of those blocks. Node_3 and node_4 are assigned similarly. The block size need not be the sector size of the disk. Bigger sizes for the block can be used, and disk scheduling algorithms can group sequential writes which can be mapped into one (big sized) block for our replication. The data size need not be equal to the block size. The data packet can be in the form of [block number, offset, length, data]. Offset is the offset into the block where the data has to be written.

In a given period the number of times a node acts as owner can be counted and this count can be compared with the count for other nodes. If warranted by the deviations between counts, low burdened nodes and high burdened nodes can exchange ownerships to level the activity between the nodes.

Various embodiments implement a replicating technique with a hierarchical structure. Instead of having one single arbitrator for each block, there can be multiple arbitrators with one arbitrator for each local set of nodes. Local set of nodes can be determined by computing the distance or cost between all nodes and dividing the nodes into domains accordingly. All members in each domain arbitrate the nodes between themselves. All members in each domain also know such peer node in all other domains which are managing the same set of blocks that map to its node. When a write request comes, it is sent to all its peer nodes. The peer nodes distribute the data to the other members in its domain. This way the node need not send all data to each of the nodes in the entire network.

Various embodiments implement a replication technique with active-quasi active configurations. Not all the nodes need to be arbitrating some of the disk blocks. Some nodes may be configured to not own any disk blocks, but to simply use other configured nodes for arbitrating the writes. All these nodes allow writes from applications, but they do not own any blocks to manage.

If a node has to read a data block, then a read lock should be used before read. After the read is over, the read lock is released. Each node is capable of performing a read lock. The module that gives the shared storage semantics calls the lock and unlock. If there is already a read lock then another read lock will not block. If there is any write lock on the node, then a read lock will block. The application can decide whether to block or wait for some specific amount of time for the read, if the application program interface (API) allows it. If there is any read lock or any write lock already acquired then any write lock will wait till all those locks are released. Locks are per block and not for entire disk. Instead of waiting for the write lock to get acquired, a node can simultaneously issue/request a remote write and acquire write lock.

Various embodiments associate one version number with each block. The version number is initialized to zero on all nodes at the beginning. Each time the block is updated, the number is incremented and if it reaches maximum value, then the version number wraps around to zero again. The version number can be stored along with the disk block by allocating extra space to it or can be stored in a separate location where all such version numbers are grouped.

Figure 2:
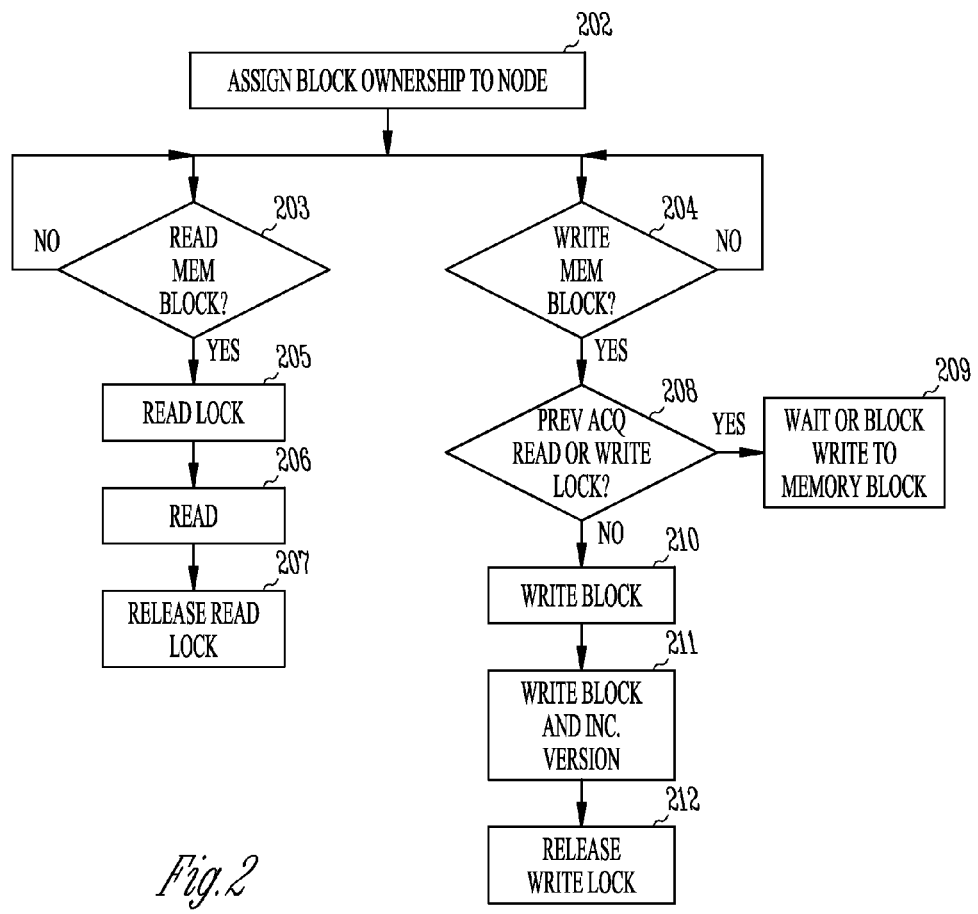
FIG. 2 is a diagram of an embodiment of a method for reading and writing replicated data.
Figure 3A:
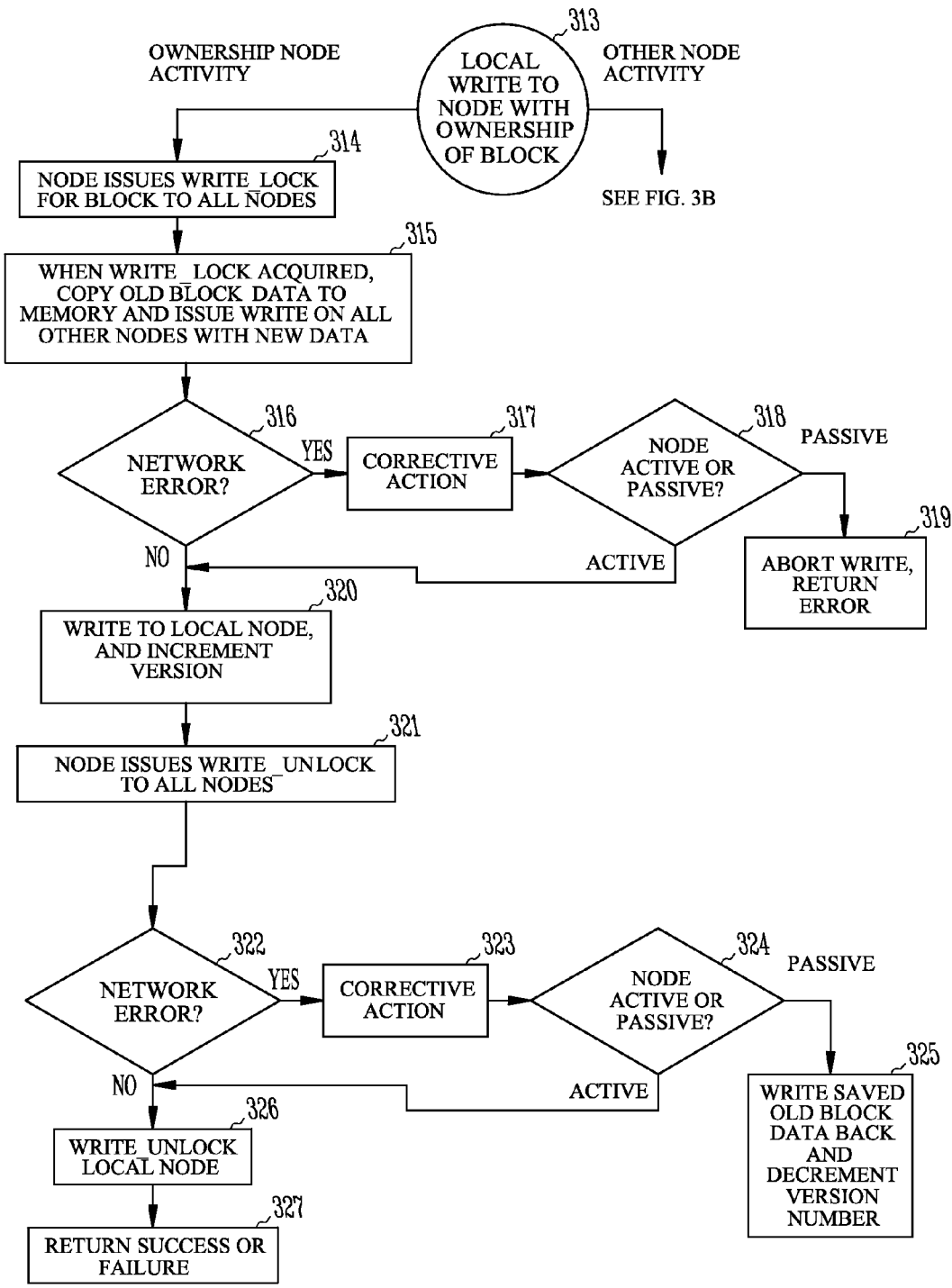
FIGS. 3A-3C are diagrams of an embodiment of a method for reading and writing replicated data on a multi-node network.
Figure 3B:
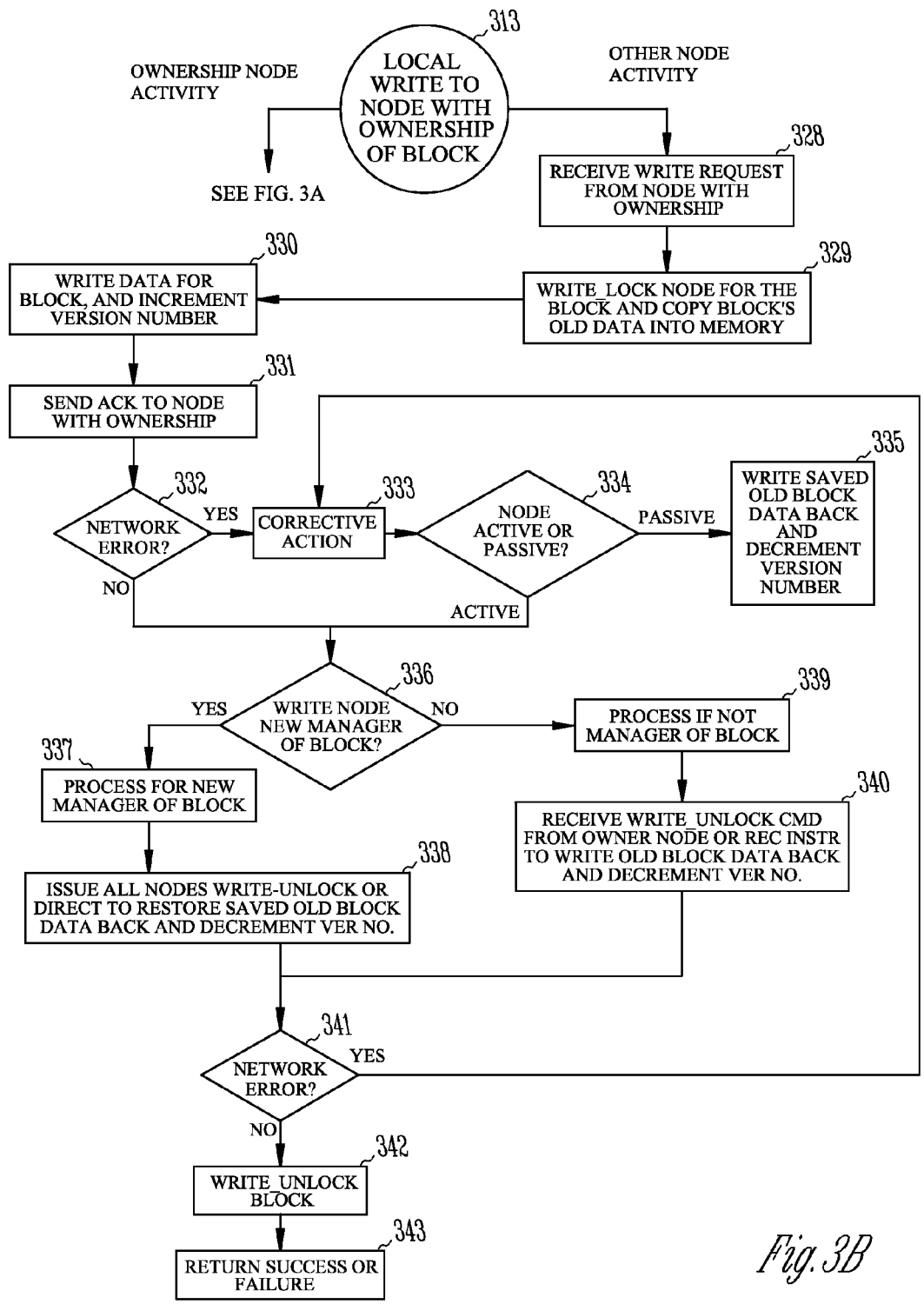
Figure 3C:
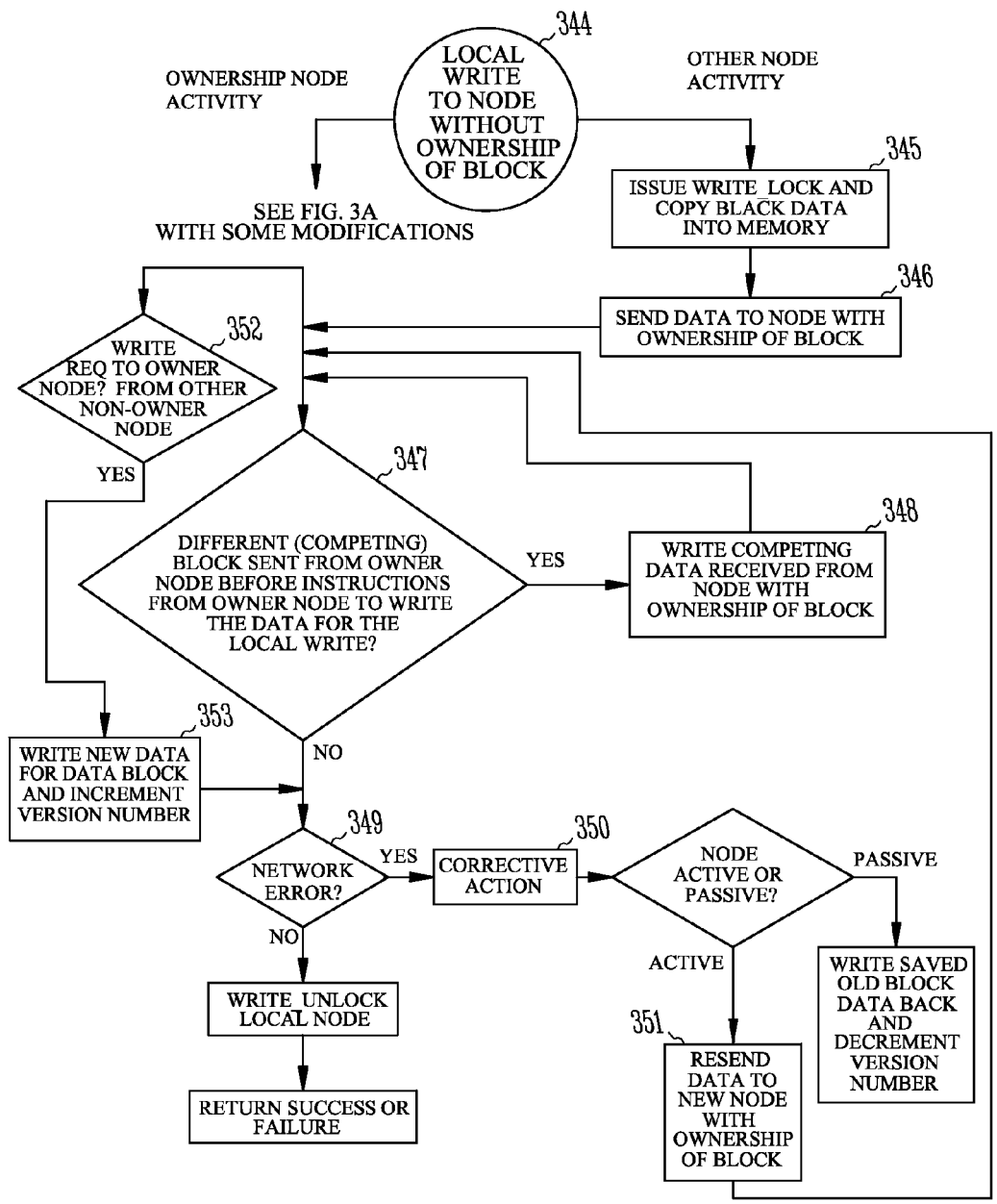

FIGS. 2, 3A, 3B, and 3C illustrate some methods implemented according to various embodiments. FIG. 2 is a diagram of an embodiment of a method for reading and writing replicated data. FIGS. 3A-3C are diagrams of an embodiment of a method for reading and writing replicated data on a multi-node network. These methods illustrate a case where the block is managed by node_1 (i.e., block number when divided gives reminder of 0). A case where there are competing writes for same block through all nodes is also considered.

With reference to FIG. 2, a node is assigned to be an owner of a block at 202. It is determined whether a read is to be performed as identified by a requested read memory block 203, or a write is to be performed as identified by a requested write memory block 204. If a read memory block is requested at 203, the node performs a read lock 205 for the block, reads 206 the block, and then release the read lock 207 for the block. If a write memory block is requested at 204, the node determines if there was a previously acquired read or write lock 208. If there was a previously acquired read or write lock, the node waits or the node blocks the write to the memory block, as illustrated at 209. If there has not been a previously acquired read or write lock, the node performs a write lock 210 for that block, writes the block and increments the version 211 associated with the block, and release the write lock for the block 212.

FIG. 3A illustrates the activity at an owner node when a local write is received at the owner node. FIG. 3B illustrates the activity at a non-owner node when a local write is received at the owner node. FIG. 3C illustrates, when a local write for a block is received at a non-owner node for the block, the activity at other non-owner nodes in then network.

With reference to FIG. 3A which illustrates when a local write comes to an owner node for a data block 313 (e.g. a local write comes to node_1 for block number whose reminder is 0), the module issues a write lock 314 for that block on the node_1. When the write lock is acquired, the block's old data is copied into memory and a write (new data for the data block) is issued on all other nodes 315. The copy of the old data can be done even before the write_lock is acquired if there are only read_locks on the block and the write_lock is the first on the queue. Corrective action (described later) is taken if any network error is detected at 316. Network errors or failures include no response/reply from a peer node in the network within some pre-configured quantum of time. After corrective action is taken 317 the node becomes either part of active-active configuration or becomes passive as illustrated at 318, as connections with an active node set is broken. If the node becomes part of an active group, then the communication with other active nodes is still maintained and control goes to next step. If the node becomes passive after the corrective action, then at 319 a local write_unlock is issued and the whole operation is aborted and error is returned. If no errors occur and an acknowledge is received from all nodes that they have written, the local disk is written and the version number is incremented at 320. At 321 a write_unlock command is sent to all other nodes. There is no need to prescribe an order for "sending write_unlock to all" and "local write" assuming there are no failures in write. If disk write fails on any of the nodes then it is intimated to the owner of the block and the old data is written back along with decrementing the version number accordingly if already incremented. The owner node in that case directs all other nodes to revert to old data and the process on the node on which the write was initiated by the application returns a write error to the application. If the network failures are again detected at 322, then corrective action is taken again 323. If at 324 the node becomes passive which means it is not part of active-active replication set of nodes, the saved old data is written back to disk and version number is decremented 325. This accounts for the fact that the sent data cannot be guaranteed to be written to all nodes' disks in case the local owner node becomes passive because of corrective action. If the local owner node becomes part of active-active set then no action is taken. A local write_unlock is performed at 326. At 327 a success is returned if all goes well; else a failure is returned.

With respect to FIG. 3B to illustrate non-owner node activity during a local write to an owner node, a write request is received 328 from the owner node (e.g. node_1 for block number whose reminder is 0 when divided by 4). At 329, a write_lock for the block is issued, if not already locked, and the block's old data is copied into memory. This copy can be done even before write_lock is acquired if there are only read_locks on the block. The data is written and the version number is incremented at 330. At 331, an acknowledgement that the data has been written is sent to the owner node (e.g. node_1).

If a network failure occurs 332, corrective action (described below) is taken 333. If at 334 the node becomes passive after the corrective action, then old data is written back and the version is decremented 335. If the node becomes active after the corrective action, the node may become the new manager for the block in question in some circumstances, and may not be the new manager for the block in other circumstances as illustrated at 336. When the node becomes the new manager for the block in question 337, the node queries other nodes to get the latest version for all that set of blocks for which ownership is newly taken and there is an on-going write for that block on its node (both conditions should be met). If any of the other active nodes already updated the block and released the write_lock (both conditions should be met), then the node directs the non-owner nodes to update their block of data with new data and increment the version. If none of the nodes released write_lock or has only old versioned block, then the node directs all nodes to keep old version and release the write_lock 338. When the node is not manager of the block in question 339, the node queries the new manger of the block as to what to do. The query indicates that there is an update done according to old managing node's order and that the node is waiting for a write_unlock command. The new manager will reply, indicating either to keep new data and perform the write_unlock, or revert to the old data and perform the write_unlock 340.

Each message is numbered and so the message sent in case new block manager itself detects and directs and the reply from new manager for what our node asks can be handled properly. The managing node can reply in one of three ways.

First, if the managing node has a new version on its side as an incomplete write, then the managing node queries other nodes to get the latest version for all that set of blocks for which ownership is newly taken and there is an on-going write for that block on its node (both conditions should be met). If any of the other active nodes already updated the block and released the write_lock (both conditions should be met), then the node directs the non-owner nodes to update their block of data with new data and increment the version. If none of the nodes released write_lock or has only old versioned block, then the node directs all nodes to keep old version and release the write_lock.

Second, if the managing node has already released the write_lock for the updated block, then the managing node detects that the node has an incomplete write and tells the non-owner node to just release write_lock as the new data is valid since managing node has already released write_lock.

Third, if the managing node has no new version on its side as an incomplete write, then the managing node decides that no other node would have released the write_lock as the new managing node itself has not received new data for that block from the old managing node. Since an acknowledge was not received from all non-owner nodes, then only the old managing node would have issued the write_unlock. In this case, the new managing node directs the non-owner node to revert back to old data and decrement version number.

If there are no errors 341, a command to unlock is received from the owner node_1. Corrective action is taken if there are network failures corrective action is taken. What happens after corrective action is taken is same as described above. A write unlock is performed 342, and a success or failure is returned at 343.

When the local write comes on a non-owner node (a node other than node_1 for block 0) 344, a write_lock is issued and data in the block is copied to memory 345. The data is sent to the owner node (e.g. node_1 for block 0) 346. The owner node for the data block sends data to other nodes and the serializes data writes. The owner node need not send a data/request for write_lock to the local non-owner node requesting the write as the data itself is sent from this node and is already write_locked. The owner node only sends a command to go ahead with the write.

If the owner node concurrently or subsequently sends a different block, then there is a competing write 347 for that block which has arrived on the owner node (either local or remote) before the write request from the local non-owner node to the owner node. The local non-owner node will write that data first 348, and wait for a command from the owner node to write the data sent by the local non-owner node previously.

If there are any network failures detected anywhere 349 then corrective action is taken 350. Depending on whether the local non-owner node becomes passive or active, similar steps as described in above cases are taken. If the local non-owner node becomes active and if its data is not yet written, then the local non-owner node resends the data to the new managing node 351.

If the write request comes to the owner node for the data block (node_1 for block 0) from another non-owner node 352, the owner node will not send data to write to the node originating the request since that node already has the data. The owner node will only send a command to the non-owner node to write the data 353. Another way to take corrective action if the owner node becomes active and the non-owner node that sent the write request becomes passive is that the owner node can instruct all other nodes to discard the data, write back old data and decrement the version number. The owner node will do this only if a write_unlock is not yet issued from the owner node to all non-owner nodes of the network.

A brief discussion of corrective action and fault tolerance is provided herein. If any of the nodes goes down, another node will take its place. The node to serve as the replacement node is determined using information regarding which node is less burdened. When the original node comes back, the original has to be synchronized, and the data will not be available to applications on the node until the synchronization completes. When syncing, the original node simultaneously participates in the shared storage (the owner node writes data on its node as part of write orders from other nodes). For blocks that are updated just then by applications on other nodes, the data is already available on that node as it participates in ongoing writes and only for the remaining data blocks it has to sync. When the original node completely syncs data, it is then made available for mounting and taking responsibility for managing a set of nodes. If the connection breaks in such a way that more than one set of nodes communicate with each other (with no connection with other set of nodes) causing the nodes to become different clusters of nodes, it is possible that each set of nodes could replicate the data with each other within their own set, thus operating in a split brain manner. To avoid this, embodiments of the present subject matter will not allow a cluster to become active unless there are more than n/2 number of nodes in the cluster at the start or after network errors are detected. All nodes in that set become passive allowing no writes. In some embodiments, an administrator can force a cluster that has become passive for not having more than n/2 number of nodes to become active.

If there is a situation where some nodes communicate with some other but not with all other nodes, then it can also lead to a situation where all nodes have communication with at least some nodes but none or some of them are having communication with all other nodes. This is different from the situation explained above where there is no communication between each group. In this situation, the administrator can be alerted to perform corrective actions and stop replicating, or it can be determined which set of nodes has the most nodes communicating with each other (the set of nodes with the most nodes communicating with each other are made into an active-active replication network, and all others nodes become passive nodes. i.e., read only).

During the corrective action phase, if there are reads or writes on the disk block in question, then applications will block until the action is taken. This can be compared to high availability cluster resources fail-over and fail-back. Client software appears to hang for that time. After the correction phase depending on the option administrator has chosen, either passive nodes can give read access to the applications or give no access even for read.

The reads are always locked and if there is any write on any node, the read will be blocked for the time the write is done. This way data integrity is maintained and the read on any node for any time gives same data no matter what node, unless the data write on any node returns with failures in which case our node may become passive.

If an application on an owner node issues a read and another similar application issues a read at the same time on a non-owner node, and another application/thread issues a write on the non-owner node at the same time but gets a write_lock before the read on same non-owner node gets a read_lock, the read will go through because the owner node did not have any writes (or locks). However, the read will wait on the non-owner node until the write goes through and gets updated data as part of read. So for a read at same time there appears to be two different data blocks being returned. However, this is a problem for any shared storage. The time at which application issues read should not be taken as the measure. The read when translated to actual disk read can be scheduled at a different time. If scheduled along with another simultaneous write, then one of the two reads can get old data and the other new data. Such applications should use a distributed lock manager when accessing shared data. The same is the case with overlapping writes (e.g. one application issues data to be written for block 1 and block 2 at the same time when another application on another node issues writes for block 2 and block 3). Before all these writes go through, there could be a point where block 1 of first application and block 2 of second application is written and a read lock is acquired by another application on another node reading the data in inconsistent state. Applications use a distributed lock manager to avoid this. This problem exists even with an actual shared disk like a SAN or a DRBD active-active configuration.

Regarding active replication for files, both writes and write opens can be arbitrated. When an application on a node opens a file in a write mode, then the node can request a write_open or a write for a block in the file. It can have an exclusive write_open in which case the writes will be done only by this node. Otherwise the writes of blocks of file are written with integrity in which case writes on same file from other node are also possible.

Figure 4:
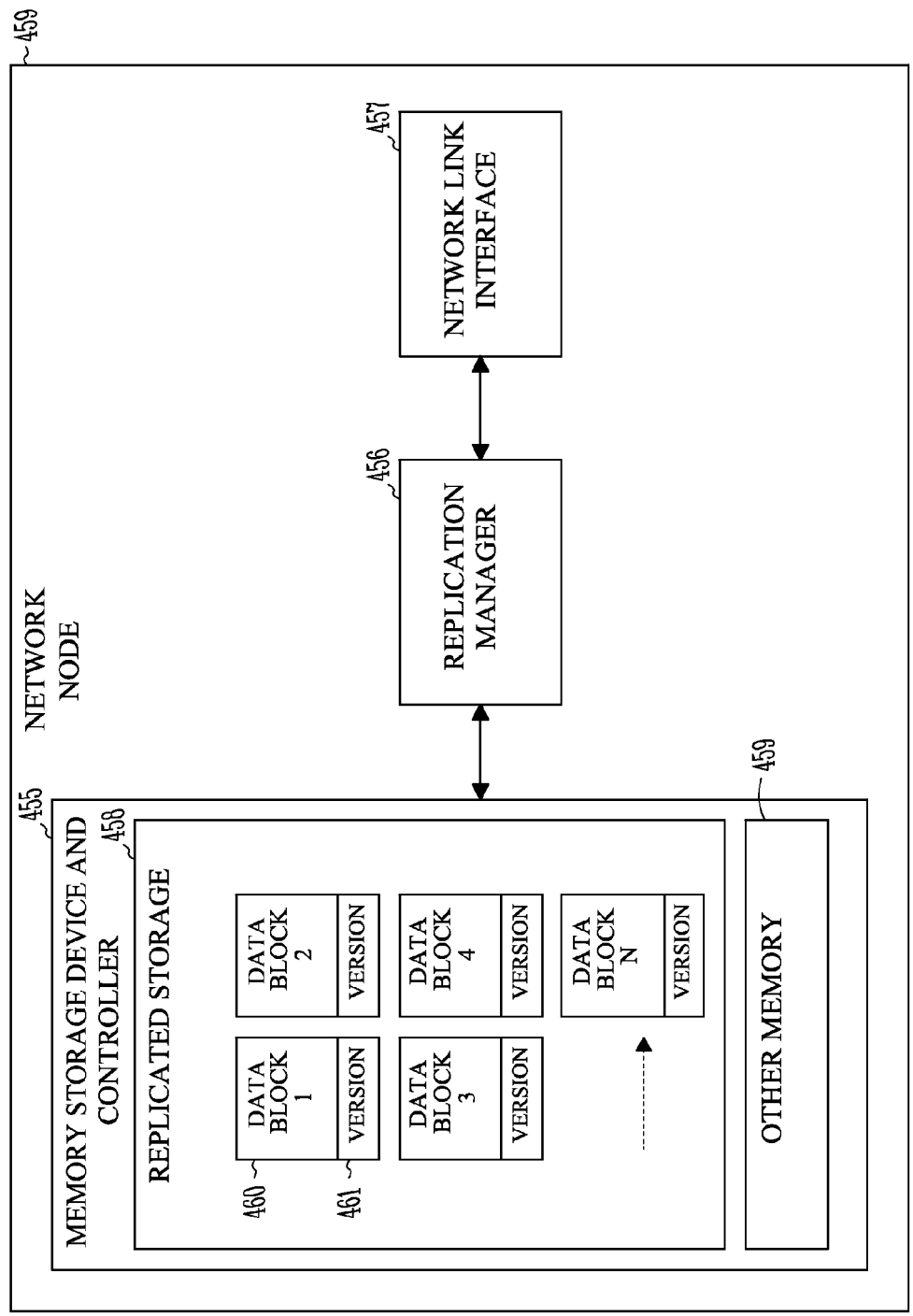
FIG. 4 is a diagram of an embodiment of a data replication system for a network node.

FIG. 4 illustrates an embodiment of a data replication system for a network node. The illustrated network node 454 includes a memory storage device and controller 455, a replication manager 456, and a network link interface for use by the node to communicate with other nodes in the replication network. The replication manager 456 is adapted to communicate with the memory storage device and controller in the node 454, and to communicate with other nodes through the interface 457. The illustrated memory storage device and controller 455 includes a replicated storage 458 and other memory 459. For example, the other memory 459 can be used to copy old data for data blocks in response to a write request. The illustrated replicated storage 458 includes n data blocks which are replicated across the network. Each data block (e.g. block 1 at 460) is associated with a version 461. The replication manager 456 controls the local processes for the node that are used to provide the desired replication for the network. The replication technique was discussed above.

Those of ordinary skill in the art will understand, upon reading and comprehending this disclosure, that the present subject matter is able to maintain data integrity and consistency in all of the above-described cases in all active node or nodes that have become passive due to network failures. As there is no single arbitrator, there is no single point of failure. The present subject matter does not require mirroring of data as the data is already available and replicated. This is useful for disaster recovery. Unlike in mirroring the data can be active on all nodes at a time. If the nodes are in the same LAN segment or if a dedicated fast network exists for this virtual shared storage, then the nodes can be considered as a SAN with respect to the feature of shared disks of SAN. A low cost SAN environment with respect to shared disks is created, though the nodes are widely apart. As network speeds increase (e.g. gigabit networks and Infiniband), increased disk latency incurred by this replication technique (due to a relatively high overhead for each write) becomes more acceptable for more applications where the advantages of the replication outweigh disadvantages of disk latency. As the number of nodes increase, the time amount that it takes for replication will not increase after certain value as all nodes will respond within that time. The slowest link between nodes becomes an issue for the replication speed.

DRBD only performs active-passive or at most two node active-active replication. The replication technique disclosed herein scales to any number of nodes and is not based on statistical analysis or unscalable analysis of relationships between entities, unlike DRBD. The present subject matter is useful for high availability applications like ocfs2. If files are used instead of blocks, a file system can be come highly available everywhere and shared at the same time. Highly available databases can also be developed using the present subject matter.

One of ordinary skill in the art will understand that, the modules and other circuitry shown and described herein can be implemented using software, hardware, and combinations of software and hardware. As such, the terms module and circuitry, for example, are intended to encompass software implementations, hardware implementations, and software and hardware implementations.

The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined. In various embodiments, the methods are implemented using a computer data signal embodied in a carrier wave or propagated signal, that represents a sequence of instructions which, when executed by a processor cause the processor to perform the respective method. In various embodiments, the methods are implemented as a set of instructions contained on a computer-accessible medium capable of directing a processor to perform the respective method. In various embodiments, the medium is a magnetic medium, an electronic medium, or an optical medium.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method of replicating data in a storage network having at least two nodes, comprising:
    assigning nodes of the network to be owners of data blocks to issue write memory block commands, each data block being owned by one node;
    performing a local write of a first data block to an owner node for the first data block, including performing a first process at the owner node and performing a second process at the non-owner nodes in the network;
    wherein the first process at the owner node includes:
        issuing a write_lock request for the first data block to all nodes in the network;
        copying old data for the first data block to a memory location, and issuing a write command to non-owner nodes in the network to write new data for the first data block;
        waiting for the acknowledgment from each non-owner node indicating that the non-owner node has written the new data for the first data block;
        writing the new data for the first data block to the owner node, and incrementing a version associated with the first data block;
        issuing a write_unlock request for the first data block to all nodes on the network; and
        performing a write_unlock for the first data block on the owner node; and
    wherein the second process at non-owner nodes includes:
        receiving the write_lock request for the first data block from the owner node for the first data block;
        performing a write_lock for the first data block, and copying old data for the first data block into memory;
        writing the new data for the first data block, and incrementing a version number associated with the first data block;
        sending the acknowledgment to the owner node; and
        performing a write_unlock for the first data block.

2. The method of claim 1, wherein the first process at the owner node further comprises:
    determining if a network error occurred prior to writing the new data for the first data block to the owner node;
    writing the new data for the first data block to the owner node if a network error did not occur; and
    if a network error occurred, performing corrective action.

3. The method of claim 2, wherein, if a network error occurred prior to writing the new data for the first data block to the owner node, the first process at the owner node further comprises:
    determining if the owner node is active or passive after performing corrective action;
    aborting the local write of the first data block to the owner node if the owner node is passive after performing corrective action; and
    writing the new data for the first data block to the owner node if the owner node is active after performing the corrective action.

4. The method of claim 3, further comprising making the owner node passive after a network error if the owner node is part of a cluster of nodes that remain in communication with each other that is less than half of the nodes of a replication network before the network error.

5. The method of claim 3, wherein determining if the owner node is active or passive includes an administrator determining if the owner node is active or passive.

6. The method of claim 1, wherein the first process at the owner node further comprises:
    determining if a network error occurred after writing the new data for the first data block to the owner node;
    performing the write_unlock for the first data block on the owner node if a network error did not occur; and
    if a network error occurred, performing corrective action.

7. The method of claim 6, wherein, if a network error occurred after writing the new data for the first data block to the owner node, the first process at the owner node further comprises determining if the owner node is active or passive after performing corrective action;
    if the owner node is passive after performing corrective action, writing saved old data back to the first data block and decrementing the version number associated with the first data block; and if the owner node is active after performing the corrective action, performing the write_unlock for the first data block on the owner node.

8. The method of claim 1, wherein the second process at the non-owner nodes further comprises:
determining if a network error occurred after writing the new data for the first data block; and
if a network error occurred, performing corrective action.

9. The method of claim 8, wherein, if a network error occurred after writing the new data for the first data block, the second process at the non-owner nodes further comprises:
determining if the owner node is active or passive after performing corrective action; and
if the owner node is passive after performing corrective action, writing saved old data back to the first data block and decrementing the version number associated with the first data block.

10. The method of claim 1, further comprising performing a third process to locally write a second data block to one of the non-owner nodes of the second data block, including:
issuing a write_lock for the second data block and copying old data for the second data block into local memory;
sending new data for the second data block to the owner node of the second data block;
if write request is received from the owner node for the second data block, writing the new data for the second data block, and incrementing a version number associated with the second data block, and performing a write_unlock for the second data block.

11. The method of claim 10, wherein the third process further comprises determining if the owner node sent competing data to write the second data block before the write request is received from the owner node, and writing the competing data to the second data block if the owner node sent competing data before the write request is received from the owner node.

12. The method of claim 10, wherein the third process further comprises:
determining if a network error occurred after writing the new data for the second data block; and
if a network error occurred, performing corrective action.

13. The method of claim 12, wherein, if a network error occurred after writing the new data for the second data block, the third process further comprises:
determining if the one of the non-owner nodes is active or passive after performing corrective action;
if the one of the non-owner nodes is passive after performing corrective action, writing saved old data back to the first data block and decrementing the version number associated with the first data block; and
if the one of the non-owner nodes is active after performing corrective action, resending the second data block to a new owner of the second data block.

14. The method of claim 12, wherein, if a network error occurred after writing the new data for the second data block, the third process further comprises performing a write unlock if a network failure did not occur.

15. A multi-node replicated storage network, comprising:
at least two network nodes, each network node including:
a memory storage device, including replicated storage having a plurality of data blocks stored therein and a version associated with each of the data blocks;
a network link interface; and
a replication manager to communicate with other network nodes using the network link interface, and the replication manager to communicate with the memory storage device;
wherein the replication managers for the at least two network nodes are adapted to:
determine node ownership for data blocks to issue write memory block commands, each data block being owned by one node; and
write a first data block using a first process at an owner node for the first data block and using a second process at non-owner nodes,
wherein the first process at the owner node for the first data block includes:
issuing a write_lock request for the first data block to all nodes in the network;
copying old data for the first data block to memory, and issuing a write command to non-owner nodes in the network to write new data for the first data block;
waiting for the acknowledgment from each non-owner node indicating that the non-owner node has written the new data for the first data block;
writing the new data for the first data block to the owner node, and incrementing a version associated with the first data block;
issuing a write_unlock request for the first data block to all nodes on the network; and
performing a write_unlock for the first data block on the owner node.

16. The network of claim 15, wherein the second process at non-owner nodes for the first data block includes:
receiving the write_lock request for the first data block from the owner node for the first data block;
performing a write_lock for the first data block, and copying old data for the first data block into memory;
writing the new data for the first data block, and incrementing a version number associated with the first data block;
sending an acknowledgment to the owner node; and
performing a write_unlock for the first data block.

17. The network of claim 16, wherein:
the first process at the owner node includes:
determining if a network error occurred prior to writing the new data for the first data block to the owner node;
writing the new data for the first data block to the owner node if a network error did not occur; and
if a network error occurred, performing corrective action; and
the second process at the non-owner nodes includes:
determining if a network error occurred after writing the new data for the first data block; and
if a network error occurred, performing corrective action.

18. A multi-node replicated storage network, comprising:
at least two network nodes, each network node including:
a memory storage device, including replicated storage having a plurality of data blocks stored therein and a version associated with each of the data blocks;
a network link interface; and
a replication manager to communicate with other network nodes using the network link interface, and the replication manager to communicate with the memory storage device;
wherein the replication managers for the at least two network nodes are adapted to:
determine node ownership for data blocks to issue write memory block commands, each data block being owned by one node; and
write a first data block using a first process at an owner node for the first data block and using a second process at non-owner nodes, wherein the replication managers for the at least two network nodes are adapted to locally write a second data block to non-owner nodes of the second data block using a third process, including:

issuing a write_lock for the second data block and copying old data for the second data block into local memory;

sending new data for the second data block to the owner node of the second data block; and if write request is received from the owner node for the second data block, writing the new data for the second data block, and incrementing a version number associated with the second data block, and performing a write_unlock for the second data block.

* * * * *